United States Patent [19]

Eagle

[11] 3,718,297

[45] Feb. 27, 1973

[54] CONTINUOUS LOOP MAGNETIC TAPE CARTRIDGE

[75] Inventor: George R. Eagle, Edina, Minn.

[73] Assignee: The Telex Corporation, Tulsa, Okla.

[22] Filed: Dec. 14, 1970

[21] Appl. No.: 97,618

[52] U.S. Cl. ............................................242/55.19 A

[51] Int. Cl. ............................................B65h 17/48

[58] Field of Search.......242/55.19 A, 55.19; 352/72, 352/78, 128; 179/100.2 Z; 274/4 B, 11 B

[56] References Cited

UNITED STATES PATENTS

| | | | |
|---|---|---|---|
| 3,341,143 | 9/1967 | Nieland et al. | 242/55.19 A |
| 3,583,652 | 6/1971 | Merry | 242/55.19 A |
| 3,568,943 | 3/1971 | Robak | 242/55.19 A |
| 2,778,880 | 1/1957 | Eash | 242/55.19 A X |
| 3,423,039 | 1/1969 | Zielke | 242/55.19 A |

*Primary Examiner*—Billy S. Taylor
*Attorney*—Carlsen, Carlsen & Sturm

[57] ABSTRACT

A reel hub and turntable are journalled to one side of a cartridge housing for receiving and supporting one side of an endless coil of magnetic tape. Tape guide means are attached to the sides of the cartridge housing for guiding the tape from the inner periphery of the coil past a reading or writing head opening and then returning the tape to the outer periphery of the coil. A plurality of elongated rib members project from the inside surface of the side of the cartridge housing which is opposite the reel hub and turntable. The rib members are radially oriented with respect to the turntable's axis of rotation and are angularly spaced from one another around the axis of rotation. The rib members extend from the inner periphery of the coil of magnetic tape to the outer periphery thereof and act as a side wall for the coil of tape. The two ribs which flank the point where the tape is withdrawn from the inner periphery of the coil are shaped and positioned to act as abutments for limiting the tape withdrawal point to a predetermined angular range. The rib which is downstream from the tape withdrawal point has a mylar scraper attached thereto which bears against the side of the tape coil and prevents the withdrawn tape from being swept under the rib by forward rotation of the tape coil. The ribs which are upstream from the tape withdrawal point have notches formed in the radially inner ends thereof to restrain the inner coil of tape when it is axially displaced by reverse rotation of the tape coil.

9 Claims, 6 Drawing Figures

INVENTOR.
GEORGE R. EAGLE
BY
Carlsen Carlsen & Sturm
ATTORNEYS

INVENTOR.
GEORGE R. EAGLE
BY
Carlsen Carlsen & Sturm
ATTORNEYS

CONTINUOUS LOOP MAGNETIC TAPE CARTRIDGE

BACKGROUND OF THE INVENTION

This invention relates to improvements in continuous loop magnetic tape cartridges in which an endless coil of magnetic tape is supported on a single reel and is drawn from the inner periphery of the reel and returned to the outer periphery of the reel after having been guided past a magnetic reading or writing head. Such magnetic tape cartridges have been known in the past and are disclosed, for example, in U.S. Pat. No. 3,226,048, which was issued to H. A. Schwartz on Dec. 28, 1965, for an "Endless Magnetic Tape Cartridge," and in U.S. Pat. No. 3,245,630, which was issued to R. L. Morris, et al, on Apr. 12, 1966, for a "Cartridge For Endless Tape."

As disclosed in the above-noted U.S. patents, the prior art continuous loop magnetic tape cartridges comprised a turntable and reel hub which were journalled to one side of a cartridge housing for supporting an endless coil of magnetic tape, and tape guide means for guiding the tape from the inner periphery of the tape coil past a magnetic reading or writing head and then returning the tape to the outer periphery of the tape coil. The tape was driven by a capstan drive mechanism which entered an opening in the cartridge housing and engaged the tape when the cartridge was inserted into the receptacle provided for it on a tape recorder.

Although such continuous loop magnetic tape cartridges had the advantage of never having to be rewound, and also of being substantially smaller than tape cartridges that use two reels, the prior art cartridges have suffered from disadvantages that tended to restrict their utility in spite of these advantages. One disadvantage has been that the tape withdrawal point on the inner periphery of the reel becomes displaced when the cartridge is handled or is used in an environment that is subject to relatively high levels of vibration, e.g. in an airplane. In some causes, the tape withdrawal point moves far enough to cause the tape to bind and break when the capstan drive is initially energized. Accordingly, the principal object of this invention is to provide a continuous loop magnetic tape cartridge which includes means for limiting movement of the tape withdrawal point and for preventing such movement of the tape withdrawal point from adversely effecting the operation of the tape cartridge.

SUMMARY OF THE INVENTION

In accordance with this invention, it has been found that the above-noted objects can be accomplished by providing a plurality of elongated rib members which project from the inside surface of the side of the cartridge housing which is opposite to the reel hub and turntable that support the coil of magnetic tape. The rib members are radially oriented with respect to the turntable's axis of rotation and are angularly spaced from one another around the axis of rotation. The rib members extend from the inner periphery of the coil of magnetic tape to the outer periphery thereof and act as a side wall for the coil of tape. The two ribs which flank the point where the tape is withdrawn from the inner periphery of the coil are shaped and positioned to act as abutments for limiting the tape withdrawal point to a predetermined angular range. The rib which is downstream from the tape withdrawal point has a resilient scraper attached thereto which bears against the side of the tape coil and prevents the withdrawn tape from being swept under the rib by forward rotation of the tape coil. The ribs which are upstream from the tape withdrawal point have notches formed in the radially inner ends thereof to restrain the inner coil of tape when it is axially displaced by reverse rotation of the tape coil. Other features of the invention are described below in connection with one specific embodiment of the invention which is illustrated in the attached drawings.

DETAILED DESCRIPTION OF THE INVENTION

Figures 1, 2, 3:
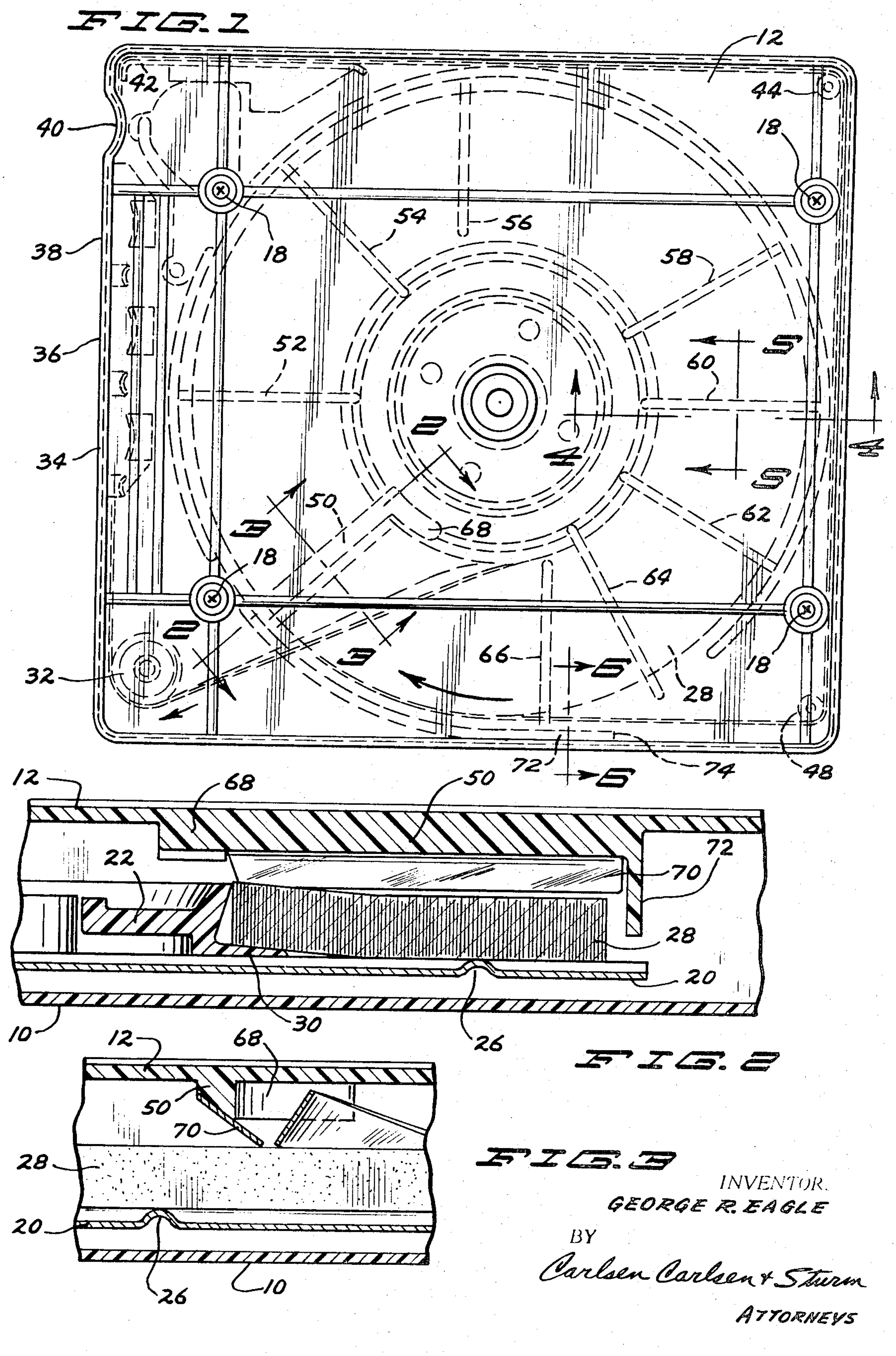
FIG. 1 is a plan view of one illustrative embodiment of the invention.
FIG. 2 is an enlarged cross-sectional view taken on the plane 2—2 of FIG. 1.
FIG. 3 is an enlarged cross-sectional view taken on the plane 3—3 of FIG. 1.
Figure 4:
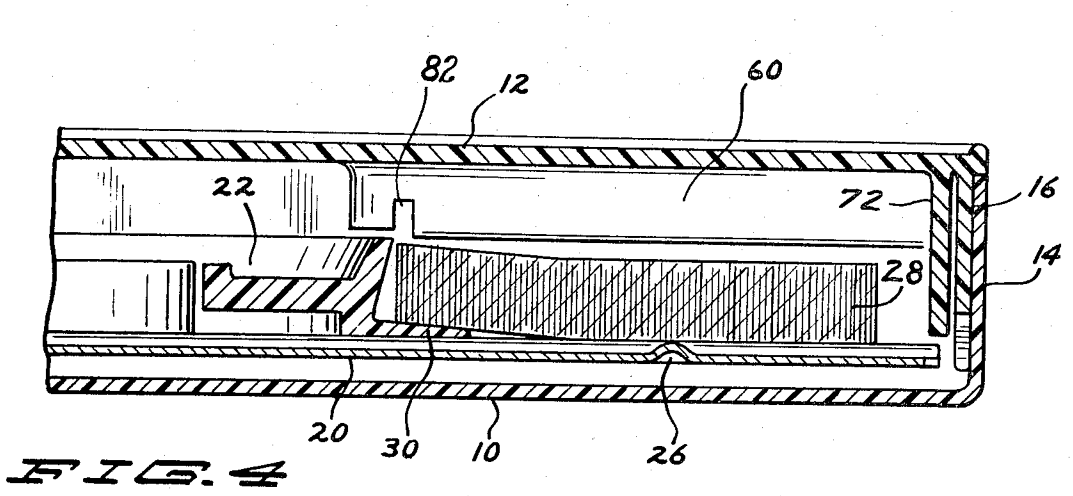
FIG. 4 is an enlarged cross-sectional view taken on the plane 4—4 of FIG. 1.
Figure 5:
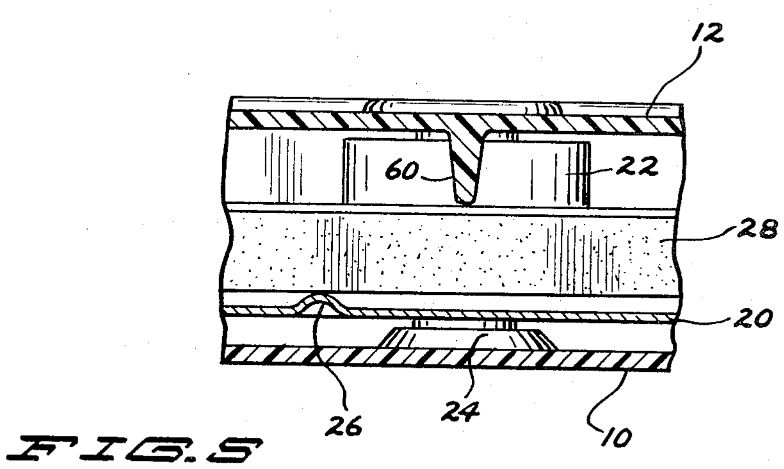
FIG. 5 is an enlarged cross-sectional view taken on the plane 5—5 of FIG. 1.

Referring to the figures, one illustrative embodiment of the invention includes a cartridge housing comprising two rectangular side members 10 and 12 which are held together in spaced parallel relationship by means of interlocking peripheral edges 14 and 16 (FIG. 4) and screws 18 (FIG. 1). In this particular embodiment of the invention, the bottom side member 10 and its peripheral edge 14 are made of metal while the top side member 12 and its peripheral edge 16 are made of translucent plastic. A flat metal turntable 20 and plastic reel hub 22 are journalled to a raised portion 24 in the center of bottom side member 10 (FIG. 5). A plurality of raised radial ribs 26 are formed in turntable 20 to provide a low friction supporting surface for a coil of magnetic tape 28 which is wound around reel hub 22 and is supported by the ribs 26 on turntable 20. The ribs 26 extend from the center of turntable 20 to the periphery thereof at an inclined angle to the radius of the turntable and are spaced around the turntable at angular intervals of approximately 28 degrees. As best shown in FIGS. 2 and 4, reel hub 22 has an inclined projecting rim 30 which raises the inner periphery of coil 28 slightly and prepares the innermost loop of tape on coil 28 for being withdrawn from the coil.

As best shown in FIG. 1, tape is withdrawn from the inner periphery of tape coil 28 and is guided around a roller 32 and from there past three openings 34, 36, and 38 which admit magnetic reading or writing heads when the cartridge housing is inserted into the receptacle provided for it on a tape recorder or the like. After passing the magnetic reading or writing heads, the tape is guided around a fixed corner guide 42, and from there around corner rollers 44 and 48 to the outer periphery of tape coil 28 approximately opposite its point of withdrawal. The tape is driven by a capstan which engages the magnetic tape through an opening 40. The capstan and its associated drive mechanism and pressure roller enter the appropriate openings in the tape cartridge and engage the tape opposite opening 40 when the cartridge housing is inserted into the receptacle provided for it on the tape recorder. The capstan applies a drive force which draws the tape from the inner periphery of tape coil 28, around roller 32, and past the openings 34, 36, and 38 for the magnetic reading or writing heads. As the tape is drawn from the inner periphery of tape coil 28, it causes the turntable 20 to rotate, and thus draws the tape around corner guide 42 and corner rollers 44 and 48 and rewinds the tape on the outer periphery of tape coil 28.

Referring to FIG. 1, a plurality of elongated rib members 50, 52, 54, 56, 58, 60, 62, 64, and 66 project from the inside surface of side member 12 and act as a side wall for tape coil 28 as best shown in FIGS. 4 and 5. The rib members 50-66 are radially oriented with respect to the rotary axis of turntable 20 and are angularly spaced from one another around the axis of rotation. The two ribs 50 and 66 which flank the point where the tape is withdrawn from the inner periphery of tape coil 28 are shaped and positioned to act as abutments for limiting the tape withdrawal point to the angular range thereinbetween. Rib 50, which is downstream from the tape withdrawal point, has an abutment member 68 that extends at right angles to its inner peripheral end for limiting the downstream movement of the tape withdrawal point. A mylar scraper 70 (FIGS. 2 and 3) is attached to the radially extending portion of rib 50 and bears against the side of tape coil 28 to prevent the tape from being swept under rib 50 due to forward rotation of the tape coil 28 or turntable 20. Rib 66, which is immediately upstream from the tape withdrawal point, prevents the tape withdrawal point from being moved in the other direction in response to reverse rotation of the tape coil 28. To achieve this purpose, rib 66 is terminated short of the innermost winding of tape coil 28 so that the readily innermost end of rib 66 prevents the tape withdrawal point from moving past it in response to reverse rotation of tape coil 28. The ribs 58, 60, 62, and 64 have notches formed in the radially inner ends thereof to restrain the inner coil of tape when it is axially displaced by reverse rotation of the tape coil. FIG. 4 shows the position of such a notch 82 with respect to rib 60, reel hub 22, and tape coil 28. The notches in ribs 58, 60, 62, and 64 are similarly positioned to restrain the inner coil of tape and hold it in the correct position so that it will not slide across the center of reel hub 22 when it becomes axially displaced by reverse rotation of the tape coil 28 but do not perform any function with regard to limiting the movement of the tape withdrawal point.

Figure 6:
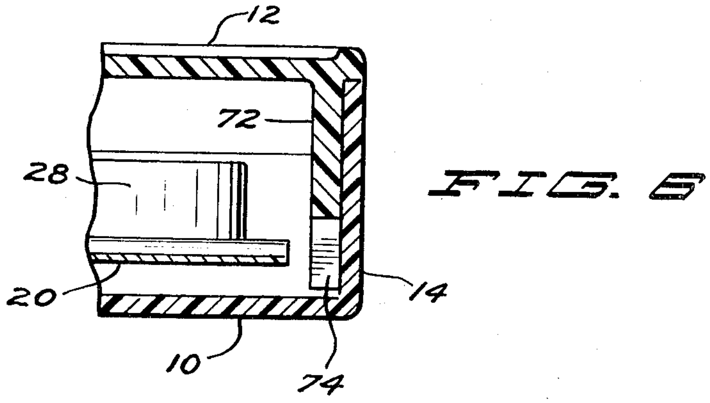
FIG. 6 is an enlarged cross-sectional view taken on the plane 6—6 of FIG. 1.

The outer periphery of the tape coil 28 is surrounded by a circular ridge 72 which projects from top side member 12 and which is opened adjacent to corner roller 48 so as to admit tape to the outer periphery of tape coil 28. The ridge 72 extends substantially tangentially to tape coil 28 at the point where tape is admitted to the outer periphery thereof and the end of ridge 72 is enlarged and lengthened at 74 so that it extends below the level of turntable 20, as best shown in FIG. 6, to act as a tape guide member and to prevent the tape from slipping under the ridge 72 in response to vibratory forces.

From the foregoing description it will be apparent that this invention provides a continuous loop magnetic tape cartridge which includes means for limiting movement of the tape withdrawal point and for preventing such movement of the tape withdrawal point from adversely effecting the operation of the tape cartridge. And although this invention has been described in connection with one illustrative embodiment thereof, it should be understood that the invention is by no means limited to the disclosed embodiment, since many modifications can be made in the disclosed structure without departing from the basic principles of this invention. For example, although a mylar scraper has been used in the disclosed structure on the rib which is downstream from the tape withdrawal point, any suitable resilient material could be used to perform this function without altering the basic operation of the device. Also, although nine elongated rib members have been used in the disclosed embodiment, a larger or smaller number could be employed if desired. These and many other modifications of the disclosed structure will be apparent to those skilled in the art, and this invention includes all modifications falling within the scope of the following claims.

I claim:

1. A magnetic tape cartridge comprising a first substantially flat side member, a second substantially flat side member, means joining said first and second side members together in spaced relationship, a turntable journalled to said first side member for rotation about an axis transverse to said side member, a reel hub attached to said turntable and rotatable therewith, said reel hub and said turntable being adapted to receive and to support an endless coil of magnetic tape, tape guide means attached to said first side member for guiding magnetic tape from the inner periphery of said coil of magnetic tape to the outer periphery thereof, a plurality of elongated rib members projecting from the inside surface of said second side member toward said turntable, said rib members being substantially radially oriented with respect to the rotary axis of said turntable, and the ribs which flank the point where said magnetic tape is withdrawn from the inner periphery of said coil of magnetic tape include means for limiting the tape withdrawal point to a predetermined angular range with respect to the rotary axis of said turntable, and the rib member which is immediately downstream from said tape withdrawal point has a resilient scraper attached thereto, said resilient scraper being oriented toward said tape withdrawal point and extending from the bottom of said rib member to the side of said coil of tape.

2. The magnetic tape cartridge defined in claim 1 wherein the rib member which is immediately upstream from said tape withdrawal point is positioned so that its inner peripheral end falls slightly short of the innermost winding of said coil of tape.

3. The magnetic tape cartridge defined in claim 2 wherein the second rib upstream from the tape withdrawal point has a notch formed in the peripherally inner end thereof to restrain the inner coil of tape when it is axially displaced from said coil of tape.

4. The magnetic tape cartridge defined in claim 3 wherein the second, third, and fourth rib upstream from the tape withdrawal point each have a notch formed in the peripherally inner end thereof to restrain the inner coil of tape when it is axially displaced from said coil of tape.

5. The magnetic tape cartridge defined in claim 3 wherein said rib which is downstream from said tape withdrawal point has an abutment member extending from the peripherally inner end thereof toward said tape withdrawal point.

6. The magnetic tape cartridge defined in claim 5 wherein said resilient scraper is made out of mylar.

7. The magnetic tape cartridge defined in claim 6 and further comprising a substantially circular ridge projecting from the inside surface of said second side member around the outer periphery of said coil of tape, said circular ridge being open at the point where said magnetic tape is guided to the outer periphery of said coil of tape, and a substantially tangential projection from said circular ridge at said open point where said magnetic tape is guided to the outer periphery of said coil of tape.

8. The magnetic tape cartridge defined in claim 7 and further comprising a elongated end on said tangential projection, said elongated end extending below the level of said turntable to prevent said tape from sliding under the edge of said tangential projection of said circular ridge.

9. The magnetic tape cartridge defined in claim 1 wherein the resilient scraper is comprised of material exhibiting the characteristics of mylar.

* * * * *